April 7, 1953  W. P. BAMFORD ET AL  2,633,673
BENDING MOLD FOR GLASS SHEETS OR PLATES
Filed April 26, 1951  2 SHEETS—SHEET 2
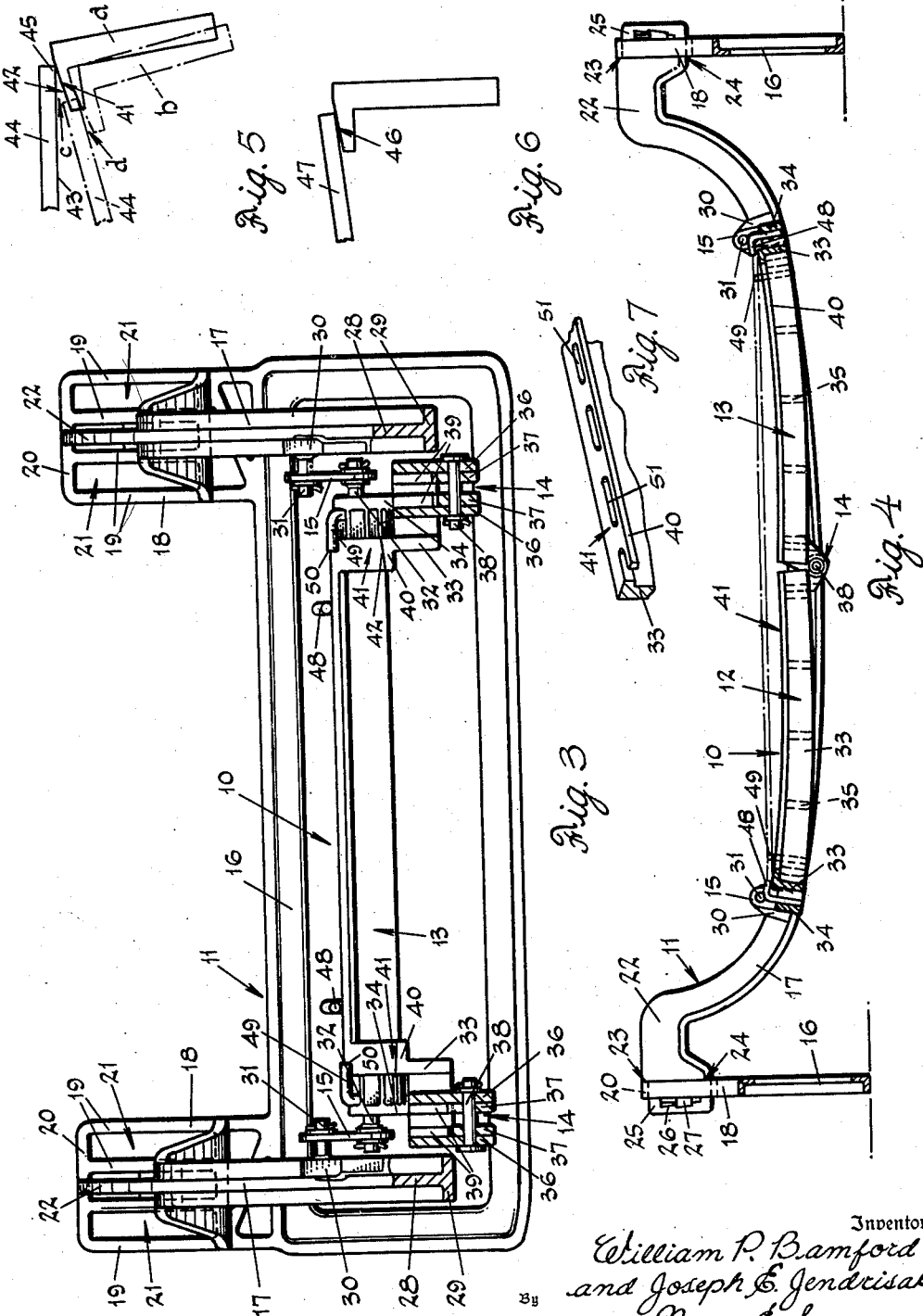
Inventors
William P. Bamford
and Joseph E. Jendrisak
By Nobbe & Swope
Attorneys Patented Apr. 7, 1953

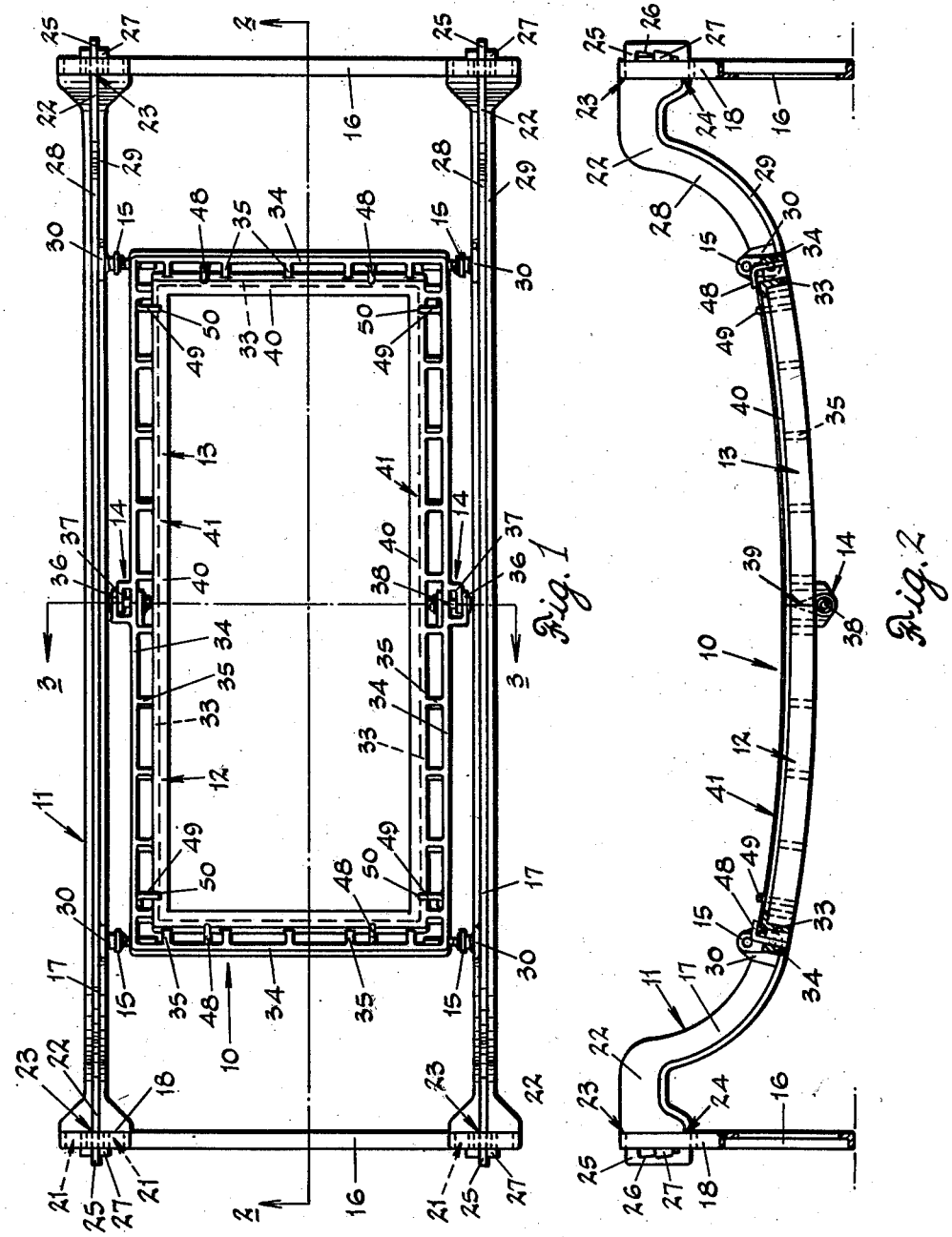

2,633,673

UNITED STATES PATENT OFFICE 2,633,673

BENDING MOLD FOR GLASS SHEETS OR PLATES

William P. Bamford, Maumee, and Joseph E. Jendrisak, Rossford, Ohio, assignors to Libbey-Owens-Ford Glass Company, Toledo, Ohio, a corporation of Ohio Application April 26, 1951, Serial No. 222,968

8 Claims. (Cl. 49—67)

The present invention relates broadly to the bending of sheets or plates of glass or other materials.

More particularly, the invention has to do with an improved bending mold of the outline or ring type wherein the supporting and shaping surface for the glass sheet or plate engages the glass sheet only around the lower margins thereof, and is so formed as to minimize contact of the glass therewith during the bending operation.

In the bending of glass sheets or plates, it is highly desirable to produce the curved or bent shape without allowing the glass to become surface marred from contact with the mold. To obtain a satisfactory bend, the lower margins of the glass sheet must of course register with the supporting or shaping surface of the mold and it is at this registering or contacting surface that marring of the glass usually occurs. Thus, with prior type molds, injury, particularly to the optical quality of the glass, may be caused by slippage of the glass sheet into an irregular position relative to the mold as it settles onto the shaping surface thereof, or by resistance of said shaping surface to necessary movement of the sheet as it settles onto the mold.

Briefly, stated the purpose of the present invention is to provide an improved bending mold having a shaping surface thereon corresponding to the desired bent curvature to be produced in a finally bent sheet of glass and which shaping surface is oriented in angular relation to the surface of the glass sheet, whereby the sheet will be either entirely or partially supported on said surface by its lower edge corners.

It is therefore, a primary aim of this invention to provide an improved bending mold for glass sheets in which the shaping surface of the mold is oriented in special angular relation to the surface of a glass sheet when bent.

Another object of the invention is to provide an improved bending mold of the above character in which the shaping surface of the mold conforms to the curvature of a finally bent sheet and which shaping surface is oriented in a predetermined angular relation to the surface of either an unbent sheet or a sheet bent to the curvature of the shaping surface.

Another object of the invention is to provide in an outline type bending mold, a ledge-type shaping surface conforming to the curvature of a glass sheet when finally bent, said shaping surface being formed by a continuous plane tangential to the edge corners of the glass sheet while flat or when bent to assume the curvature of the shaping surface.

A still further object of the invention is to provide an improved bending mold of the above character wherein the ledge-type shaping surface thus afforded is adapted, by reason of its width and angular disposition, to support the sheet of glass entirely along its edge corners, thereby eliminating or reducing frictional contact between the glass and the shaping surface to a minimum.

Other objects and advantages of the invention will become more apparent during the course of the following description, when taken in connection with the accompanying drawings.

In the drawings, wherein like numerals are employed to designate like parts throughout the same;

Fig. 1 is a plan view of a bending mold as constructed in accordance with the invention;

Fig. 2 is a vertical, longitudinal section of the mold as taken on line 2—2 of Fig. 1 when the movable sections of the mold are in closed position;

Fig. 3 is a vertical, transverse section of the mold as taken on line 3—3 of Fig. 1;

Fig. 4 is a sectional view, similar to Fig. 2, when the movable sections of the mold are in glass receiving position;

Fig. 5 is a diagrammatic view illustrating the relation of the glass sheet to the mold before and after the bending operation;

Fig. 6 is a diagrammatic view in which the longitudinal edge of a glass sheet is shown in relation to the surface of the mold after producing a double bend in the glass sheet; and Fig. 7 is a fragmentary perspective view showing a modified form of mold shaping surface.

Since it is always preferable to utilize the maximum area of a glass sheet for good visibility, it is customary to define the major central portion of the sheet area by a potential border or margin within which surface mars will be tolerated and which will ultimately be concealed by a mounting member. In the case of bent glass sheets, intended for the windows or windshields of automobiles, the requirement for high optical quality is particularly stringent and accordingly, the marginal areas of a sheet to be bent, and which may be eventually concealed, are the only portions of the sheet surface that can be contacted by a mold and in which mold marks or similar mars can appear.

Thus it has become imperative to handle or process these bent glass sheets in such a manner that the entire centrally disposed or visual area lying inwardly of the margins, will be of acceptable optical quality and without injurious mars. We have found that, in prior type molds, marring of the glass sheet surface, the certain instances of bending, will occur upon uncontrolled slippage of the glass during the bending operation so that it either falls completely from the mold or, more seriously, becomes located thereon so that contact of the actually supported glass surface in one or more end areas will occur well within the defined visual area. Also repeated bending operation, on the same molds, increase the possibility of optical mars in the glass surface in contact with the mold surface since minute and often-times imperceptible wrinkles or roughened areas will irregularly appear in this surface as a consequence of its expansion and contraction under repeated heating and cooling cycles. These roughened areas in the mold surface attack the softened "skin" or surface of the glass when heated to bending temperature and cause distortion or irregular stretching in the glass surface as it is settling into conformity with the curvature of the shaping surface.

In previous attempts to reduce these objections, it has been proposed to reduce the width of the shaping surface until it represents only a thin rail or web on which the glass is received. This, however, actually increases the possibility of surface marring since there is little support for the glass should it shift laterally as it settles and in more exaggerated cases, the glass may fall from the mold. The thinner shaping surface is also highly vulnerable to warpage and the creation of wrinkled or roughened areas.

According to the present invention, however, we have found that a wider shaping surface will afford more adequate support for the glass, and furthermore, that the mars or "mold marks" occasioned by slippage and/or roughened mold surfaces can be obviated by orienting this wider surface in a plane tangential to the edge of the glass sheet at all times and on which only edge contact can be effected.

Referring now to the drawings, there is disclosed one form of outline or ring type bending mold, constructed in accordance with the invention, which is designated in its entirety by the numeral 10. This mold is carried in suspended relation within a frame or rack 11 and is composed of two mold sections 12 and 13 substantially U shaped in plan and hingedly connected by means of hinges generally indicated at 14. The mold 10, which may be described as being of the "hinge mold" type, is carried within the rack 11 by means of links 15 that are arranged at the corners of the mold and adapted to swing with reference to the rack 11 to permit articulation of the mold sections during their opening and closing actions.

The rack 11 comprises end members 16 and side rails 17 which parallel the mold sections 12 and 13 and are shaped to the general curvature of the mold 10 in its entirety. The end members 16 are substantially rectangular in outline and, at their upper corners, are provided with vertically rising slotted sections 18. These slotted sections 18 are formed by a series of four vertically disposed pillars 19 which are joined at their upper ends by a horizontally disposed web 20 to form three vertical slots 21 through which the ends of the side rails 17 may be inserted.

As shown in Fig. 2, the ends 22 of the side rails 17 are provided with shoulder portions 23 and 24, that are adapted to abut one side surface of the slotted sections 18, and a tongue 25 which is inserted through one of the slots 21. The tongues 25 at the opposite ends of each side rail 17 are located in the slots 21 of the sections 18 to arrange the said side rails in parallel and according to the spacing required to accommodate the mold 10. Apertures 26 are formed in each of the tongues 25 and are preferably triangular in outline to receive wedge blocks 27 which will firmly position the shoulders 23 and 24 against the slotted sections 18 and generally effect a rigid construction throughout the framework 11.

The body portion of each side rail 17 has a cross section which approximates an inverted T and consequently provides a vertical rib 28 and horizontally disposed flanges 29 extending outwardly from the lower edge thereof. Substantially equidistant from the ends 22 of the side rails and according to the over-all length of the mold 10, there are secured on the innermost flanges 29 and against the rib 28 opposed pairs of vertically disposed plates 30. These plates are provided with horizontally extending rods 31 for pivotally supporting the upper ends of the links 15. The lower end of each link 15 is formed to provide a journal for a rod 32, the opposite end of which may be fixedly attached to the mold sections 12 and 13 in their respective corner areas. The mold 10 is thus pivotally and freely suspended by the links 15 within the rack 11 and the sections thereof are movable in their hinged association to move outwardly and upwardly from their closed position to a more expanded or open position by swinging movement of the links 15.

As herein disclosed, the sections 12 and 13 of the mold 10 constitute a two-part, hinged mold construction and, for the purposes of illustration, provide for the bending and shaping of substantially rectangular sheets or plates of glass. It will be understood, of course, that the novel features of the present invention may also be embodied in non-hinged types of outline molds, as well as in mold constructions which include a multiplicity of hingedly connected sections and upon which glass sheets are shaped into compound and oftentimes difficult bends. It is likewise within the purview of the invention to include other contemplated pattern cut outlines and/or compound curves whether said curves are in one or both axes of the glass sheet.

In the present instance, the similar construction of each U-shape mold section includes an inner rail 33, an outer rail 34 and transversely disposed webs 35 that are interposed between the inner and outer rails to adequately reenforce the mold throughout its open outline.

The hinges 14, at the adjoining ends of the mold sections 12 and 13, are formed by pairs of ears 36 on the section 12 and similar pairs of ears 37 on the section 13. Preferably, the pair of ears 36 are spaced apart sufficiently to receive the ears 37 in overlapping relation therebetween and when thus assembled may be provided with journal openings for the hinge pins 38. As will be noted, the pairs of ears 36 and 37 are formed as continuations of the outer rails 34 of each of said mold sections. The opposed edges of these ears are formed as at 39 to provide abutting surfaces that will function as stops and thereby prevent reverse pivotal movement of the mold sections once they have arrived at the closed position of the mold.

The inner rail 33 of each of the sections 12 and 13, is provided with a continuous, horizontal and inwardly disposed flange 40 along its upper edge which constitutes a part of the mold contour and upon the upper or top surface of which the actual shaping surface 41 is finished.

This shaping surface, both in the longitudinal and transverse axes of the mold 10, is finished to correspond to the desired curvature of a glass sheet when finally bent. While the shaping surface is being acted upon, in accordance with this invention, to obtain the required curvature, it is further worked to orient the surface plane thereof in the desired angular relation to a plane in which the glass sheet will be located when bent. In other words, the shaping surface 41, at any point in its continuity, will be finished to present a supporting surface for the glass to shape the same, when properly heated, into conformity with the desired curvature of bend; while the plane of said surface will be disposed at a sufficient angle that only a contacting relationship at the edge corner of the sheet will be established between it and the glass, either when the sheet is flat or after it has been bent. This angle may, by way of example, be in the order of ten degrees, although this angularity may be increased or decreased to agree with the intended relation to be developed and maintained between the surfaces of the mold and of the glass sheet when the same is bent.

This angular relationship between the shaping surface and the glass is illustarted in Fig. 5 wherein an end of a mold section is diagrammatically shown in full line as in the open position of the mold, indicated by the letter $a$, and by broken line as in the closed position of the mold, indicated by the letter $b$. Now it is well known when the sections of a hinged mold are raised to their open positions that an unbent sheet of glass will rest upon the lower corner of its oppositely disposed end edges and in spaced relation to the shaping surface on the related ends of the mold, and that ordinarily these edges are adapted to located the said sheet for proper registration with the shaping surface of the mold when the glass subsequently softens and settles thereagainst.

However, as previously mentioned, and in spite of working under optimum conditions, there are instances when a glass sheet will slip or shift laterally so that along at least one edge area it will exceed the marginal area of tolerance and consequent occurrence of "mold mark" or other objectional mars will be noticeable in the visual area. Thus, where the mold is provided with a ledge-type shaping surface, such as the surface 41, and this surface disposed in an angular plane, as indicated at 42, the lower surface 43 of the sheet 44 may be located in angular relation thereto while the sheet is flat and, though the degree of the angle is reduced, the corner 45 will still be maintained in an edge to surface relation after bending (as shown in broken lines in Fig. 5) despite the fact that the body of the sheet will have settled into conformity with the general curvature of said surface.

It will be appreciated that, even with prior mold constructions, when the sheet is flat or unbent at the initial period of the bending operation, it will be supported by its lower edge corners on the opposite ends of the mold and by reason of the angular relation thus established, the lower margins will be normally spaced from contact with the shaping surface of the mold as indicated by letter $c$. However, as the glass softens and settles with a resulting movement of the mold to its closed position, such as in indicated by the broken line $b$, the glass settles into conformity with the bending contour of the shaping surface and, with the prior mold construction the surfaces of the marginal areas have rested in intimate contact with the surface 41.

With the specially oriented angular relationship between the shaping surface of the mold and the glass sheet, as provided by our invention, on the other hand, a developed angle of separation, as indicated by letter $c$, between the shaping surface 41 and glass sheet 44 will be substantially greater than the angle ordinarily created between these surfaces with prior mold constructions, so that, according to this invention, there will be included an angle of sufficient magnitude to create an angular spacing of the sheet from the shaping surface even after the glass is finally bent as indicated by letter $d$. Moreover, by this novel construction, slight shifting of the glass will be accommodated since the sheet is at all times supported by the lower edge corner 45 and it will be practically impossible for the marginal areas of the glass to become marred or to slide off the mold.

The relation of an angularly disposed mold shaping surface to the lower surface of a glass sheet has hereinabove been described in connection with a single bend through one of the longitudinal axis of the sheet, while the transverse axis of the sheet is maintained in a substantially unbent or straight line. Under these circumstances, there is no movement of the glass sheet over the portions of the shaping surface upon which the longitudinal edges of the sheet settle during the bending operation. Consequently, the angularity of these portions of the shaping surface may be of any degree sufficient to provide adequate spacing of the surfaces.

Now, in the event of double bending through both axes of the sheet, the angular disposition of the shaping surface may be increased until the angular plane thereof is tangential to the lower corner of the longitudinal edges of the sheet when transversely bent. As shown in Fig. 6, the shaping surface indicated at 46, may therefore be finished on the flange 40 of the rail 33 to the degree of angle computed from a plane tangential to the arc of a radius to which the glass sheet 47 is to be bent in its transverse axis.

In actual practice, the sections 12 and 13 of the mold 10 are raised by pivoting the same on the hinges 14 and, since in a simultaneous action, the overall length of the sections will be increased, the links 15 will be swung outwardly or out of plumb to compensate for such lengthening of the mold. In moving from the closed position of Fig. 2 to the open position shown in Fig. 4, the end areas of the mold sections are separated sufficiently to receive the flat sheet of glass 44 therebetween. For locating the sheet and employing the same to initially restrain the mold in its open position, the mold sections are equipped with locator devices 48 which will locate the ends of the glass sheet equally from the ends of the mold sections and bear the thrust of the mold as it endeavors to move by gravity to its closed position against the rigidity of the glass sheet while flat. In order to center the sheet 44 transversely on the mold 10, the sections thereof may also be provided with locating devices 49, the ends 50 of which are directed inwardly to engage the longitudinal edges of the sheet while the mold sections are in their open positions.

Now, as the mold is carried through a suitable furnace and the glass properly softened, the out-of-plumb positions of the links 15 will tend with the aid of gravity to urge the mold sections inwardly and downwardly to their closed positions. The glass sheet, which when cold maintains a substantially straight line, initially is supported by its edge corners 43 on the angled plane 42 of the shaping surface 41. Subsequently, as it softens and settles into conformity with the contour of the said surface, when the mold sections are located in their closed positions, the corners 43 of the glass will move inwardly across the angled plane of the surface 41 still maintaining the marginal area of the said sheet out of physical contact with the shaping surface. In the event that one end of the sheet in settling slips overly laterally, the character of the edge corner support will thus prevent the marginal area of the under surface from contacting any portion of the shaping surface.

Support of the glass sheet at the lower corner of its edges will also reduce, if not eliminate, the tendency of the glass sheet to come into frictional surface contact with the shaping surface of the mold. Where, as in the case of prior mold constructions, support of the glass is sustained on its marginal areas, the softened surface, or so-called "skin," of the glass may tend, while bending into conformity with the mold, to substantially drag over the shaping surface or follow minute irregularities of said surface and consequently not assimilate the general movement of the glass into the desired curvature. These affected areas are usually of a "spotty" or irregular spacing throughout the perimeter of the sheet and the results of their origination is maintained when the glass cools in its finally bent shape. By reason of nonuniform movement of the glass skin, the overall plane is disturbed and the optical quality of the glass is impaired by these distorted areas. Now, by continuously separating the marginal areas of the glass from bodily contact, as provided by the present invention, and carrying the same with a minimum of support along the lower edge corners on the angularly disposed shaping surface, the glass will be able and tend to follow and settle into entire conformity with the curvature of the shaping surface and without being influenced by any roughened areas therein.

While the angular relation developed between the mold shaping surface and the glass sheet has heretofore been discussed in terms of angles or the degree of the included angle, it is possible to arrive at the same satisfactory conclusion for producing either single or double bends in another manner within the scope of the present invention. For example, where the known radius of a desired bend through one axis is in the order of one hundred inches, the finishing of the ledge type shaping surface to a radius of ninety inches will produce a contoured surface upon which the edge corner of the glass sheet will rest during the entire bending operation. Accordingly, the tangential relation between the surface of a glass sheet and the surface of a bending mold may be determined and developed by angular disposition of said mold surface to the surface of the glass sheet when finally bent or by shaping said mold surface to the arc of a different radius than that to which the glass is bent. Provision is thus made for supporting the glass by its opposed edge corners by two alternative constructional procedures.

As previously noted, the curved outlines of the side rails 17 of the framework 11 and the mold 10 are substantially the same so that, if desired, the mold and the bent glass sheet carried thereon may be passed through a tempering area in which blasts of cooling air are directed against the upper and lower surfaces of the hot glass.

Under certain operating conditions and in order that a complete exposure of the glass surfaces to the effects of the cooling blasts of air can be obtained, the flange 40 of the inner rail 33 may be suitably modified as shown in Fig. 7. By the provision of regularly spaced circular openings, or elongated slots, such as are indicated at 51, in the body of the flange 40, the marginal areas of the glass will be as susceptible to the tempering influence of the air as the more centrally exposed areas. This may also be accomplished by forming the top surface of the flange 40 in a continuous series of serrations or ridges.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. A mold of generally open ring formation for bending sheets or plates of glass comprising a substantially continuous rail arranged in a pattern which in plan conforms in outline to the patterned perimeter of a sheet bent on said mold and which in cross section conforms to the curvature to which it is desired to bend a glass sheet on said mold, and a flange projecting inwardly from said rail and having a top surface which constitutes the shaping surface of said mold, said shaping surface being disposed in angular relation to the surface of a sheet after it is bent on said mold whereby said bent sheet will be supported in edge corner to surface contact on said shaping surface.

2. A mold of generally open ring formation for bending glass sheets or plates comprising a substantially vertical rail arranged in a pattern which in plan conforms in outline to the patterned perimeter of a sheet bent on said mold and the upper edge of which in cross section conforms to the curvature to which it is desired to bend a glass sheet on said mold, and a generally horizontally disposed flange extending inwardly from said supper edge of said rail and having a top surface constituting the shaping surface of the mold which lies at an angle to the lower surface of a glass sheet bent on said mold whereby to maintain edge corner to surface contact therewith while said sheet is settling into conformity with the curvature of the shaping surface.

3. A mold of generally open ring formation for bending glass sheets or plates comprising a substantially vertical rail arranged in a pattern which in plan conforms in outline to the patterned perimeter of a sheet bent on said mold and the upper edge of which in cross section conforms to the curvature to which it is desired to bend a glass sheet on said mold, and a generally horizontally disposed flange extending inwardly from said upper edge of said rail and having a top surface constituting the shaping surface of the mold and which extends downwardly at an angle sufficient to prevent a glass sheet being bent on said mold from contacting said shaping surface with other than a lower edge corner while it is sagging from the flat to its finally bent shape.

4. A mold of the open ring type for bending sheets of glass or like materials comprising a plurality of mold sections having shaping surfaces formed thereon and hingedly connected together for movement into open position to receive an unbent sheet in bending relation thereon and into closed position in which the shaping surface conforms to the curvature to which the sheet is to be bent on the mold, the shaping surfaces of said mold being disposed in angular relation to the bend curvature whereby the sheet when received thereon will be maintained in edge corner to surface contact therewith.

5. An open ring type mold for bending glass sheets or plates comprising a plurality of mold sections having shaping surfaces formed thereon and hingedly connected together for movement into an open position to receive an unbent sheet in bending relation thereon and into a closed position in which the shaping surface conforms to the curvature to which the sheet is to be bent on the mold, means for locating a sheet to be bent in proper registry with the shaping surface, said shaping surface being located in angularly disposed relation to the bend curvature whereby an edge corner to surface contact will be established with certain portions of the sheet perimeter when the mold sections are in their open position and maintained as the sheet when properly heated settles into conformity with the curvature of said shaping surface.

6. A mold of open ring type for bending glass sheets or plates comprising a pair of mold sections hingedly connected together for movement into an open position to receive an unbent sheet in registration for bending thereon and into a closed position in which they conform to the curvature to which the sheet is to be bent on the mold, each of said mold sections including a substantially continuous rail which in plan conforms to the patterned perimeter of the sheet when bent, a horizontally disposed flange projecting inwardly from said rail and having a sheet shaping surface formed on the top surface thereof, said shaping surface being formed on said flange in angularly disposed relation to the bend curvature of the mold whereby an edge corner to surface contact will be established between the sheet and the mold when the latter is in its open position and which contact will be maintained by the angularly exposed relation between the bent sheet and the mold when in its closed position.

7. In an open ring type mold for bending glass sheets or plates, a shaping surface in the form of a ledge having an outline which in plan conforms to the patterned perimeter of a sheet bent on said mold and which in cross section conforms to the curvature to which it is desired to bend a glass sheet on said mold, the portions of said shaping surface which receive the opposite margins of a sheet bent on said mold lying in a plane defined by the arc of a circle having a lesser radius than the radius to which the glass sheet is bent on said mold.

8. A mold of generally open ring formation for bending sheets or plates of glass comprising a rail arranged in a pattern which in plan conforms in outline to the patterned perimeter of a sheet bent on said mold and which in cross section conforms to the curvature to which it is desired to bend a glass sheet on said mold, and a shaping surface for said mold formed on the top surface of said rail and disposed in angular relation to the surface of a sheet that has been bent on said mold whereby said bent sheet will be supported in edge corner to surface contact on said shaping surface.

WILLIAM P. BAMFORD.
JOSEPH E. JENDRISAK.

REFERENCES CITED

The following references are of record in the file of this patent:

UNITED STATES PATENTS

| Number | Name | Date |
| --- | --- | --- |
| 2,057,763 | Boyles et al. | Oct. 20, 1936 |